(12) United States Patent
Robertson

(10) Patent No.: US 7,748,523 B2
(45) Date of Patent: Jul. 6, 2010

(54) AUTOMATED HANDLING LINE GUIDE RAIL ASSEMBLY

(75) Inventor: John Robertson, Glasgow (GB)

(73) Assignee: Diageo PLC, Edinburgh (GB)

( * ) Notice: Subject to any disclaimer, the term of this patent is extended or adjusted under 35 U.S.C. 154(b) by 169 days.

(21) Appl. No.: 11/629,963

(22) PCT Filed: Jun. 21, 2005

(86) PCT No.: PCT/GB2005/002447

§ 371 (c)(1),
(2), (4) Date: Sep. 25, 2008

(87) PCT Pub. No.: WO2005/123553

PCT Pub. Date: Dec. 29, 2005

(65) Prior Publication Data
US 2009/0014286 A1  Jan. 15, 2009

(30) Foreign Application Priority Data
Jun. 21, 2004 (GB) .................................. 0413853.3
Jun. 24, 2004 (GB) .................................. 0414211.3

(51) Int. Cl.
*B65G 21/20* (2006.01)
(52) U.S. Cl. .................. 198/836.1; 198/836.3; 198/831
(58) Field of Classification Search .................. 198/831, 198/836.1, 836.3, 836.4
See application file for complete search history.

(56) References Cited
U.S. PATENT DOCUMENTS 2,229,605 A * 1/1941 Snyder et al. ............ 198/836.3
4,930,621 A * 6/1990 Brown et al. ................. 198/831

(Continued)

FOREIGN PATENT DOCUMENTS

CH          431 377 A       2/1967

(Continued)

OTHER PUBLICATIONS

International Search Report from Corresponding International Application No. PCT/GB2005/002447, dated Oct. 5, 2005, 13 pages.

*Primary Examiner*—Douglas A Hess
(74) *Attorney, Agent, or Firm*—Brinks Hofer Gilson & Lione

(57) ABSTRACT

An automated handling line guide rail assembly. The automated handling line guide rail assembly comprises a guide rail that defines the perimeter of a path of a container when conveyed along part of an automated handling line. The path and hence the perimeter are arcuate about a center and positioned at a radius from the center. The guide rail is movable radially to define the perimeter at a plurality of different radii from substantially the same center and the guide rail comprises at least three segments. The first segment is driveable in a substantially radial direction; the second segment is connected to the first segment by a link and the third segment is connected to the second segment by a link such that the second and third segments follow movement of the first segment. The first and second segments and the second and third segments are arranged in superposition to overlap and are provided with a slideable link between overlapping portions to allow relative circumferential movement between the first and second segments and the second and third segments as the segments move radially inwardly and outwardly.

19 Claims, 3 Drawing Sheets

U.S. PATENT DOCUMENTS

| | | | |
|---|---|---|---|
| 4,932,517 A * | 6/1990 | Johnson | 198/836.1 |
| 5,291,988 A | 3/1994 | Leonard | |
| 5,386,900 A * | 2/1995 | Horth et al. | 193/2 R |
| 5,782,340 A * | 7/1998 | Dolan | 198/841 |
| 5,911,306 A * | 6/1999 | Ferrari | 198/836.1 |
| 6,050,396 A * | 4/2000 | Moore | 198/836.3 |
| 6,059,096 A * | 5/2000 | Gladieux | 198/836.3 |
| 6,378,695 B1 | 4/2002 | Rinne | |
| 6,889,823 B2 * | 5/2005 | Delaporte et al. | 198/836.3 |
| 6,899,220 B2 * | 5/2005 | Saeki | 198/831 |
| 7,431,150 B2 * | 10/2008 | Ranger | 198/836.3 |
| 7,520,380 B2 * | 4/2009 | Ranger | 198/861.1 |

FOREIGN PATENT DOCUMENTS

| | | |
|---|---|---|
| EP | 0 412 059 A1 | 2/1991 |
| WO | WO 94/12412 | 6/1994 |
| WO | WO 2004/074142 A1 | 9/2004 |

\* cited by examiner

AUTOMATED HANDLING LINE GUIDE RAIL ASSEMBLY

This application claims the benefit of priority under 35 U.S.C. §371 to Patent Cooperation Treaty Patent Application No. PCT/GB2005/002447, filed on Jun. 21, 2005, which was published in English under Publication No. WO 2005/123553. This application further claims the benefit of priority to UK applications GB 0413853.3 filed on Jun. 21, 2004 and GB 0414211.3 filed on Jun. 24, 2004. The disclosures of the above applications are incorporated herein by reference The present invention relates to an automated handling line guide rail assembly for use on an automated handling line where containers are being processed. In particular, the present invention relates to an adjustable guide rail assembly whose position may be altered to define arcs of varying radii.

A typical application of the present invention will be on a bottling line where a container such as a bottle may first be rinsed, then filled, capped and labelled. Each of these processes is generally performed by a separate machine at different locations along the automated handling line. The containers are conveyed between the various machines along generally rectilinear paths and are presented to and taken from the various machines along arcuate paths where the spacing between containers is regulated to match the required spacing of the processing machine by using a star wheel and guide rail assembly.

Such a star wheel and guide rail assembly combination is described in our co-pending British Patent Application No. GB0322492.0. Essentially, a guide rail assembly defines the outer limit of an arcuate path along which the bottles are conveyed by the star wheel. A guide rail assembly generally comprises upper and lower guide rails that support a container at two heights. As the name suggests, a star wheel is a rotating wheel of a generally star shape, the star shape being defined by a plurality of recesses that receive a container to be processed. In our co-pending application, the recesses are defined by the periphery of a pair of top and bottom plates and by pairs of opposed fingers that contact the containers. In operation, the star wheel rotates such that the first bottle presented to the star wheel is received within a recess and is contacted by the fingers. The container is then conveyed along a path defined by the star wheel and the guide rail that runs around and is spaced from the centre line of the path to be fed upon exit to a processing machine. As will be appreciated, the spacing of the recesses in the star wheel determine the spacing with which containers are passed to the machine.

Any particular automated handling line is likely to process containers having a variety of different shapes and sizes. Traditionally, different shapes and sizes of containers have necessitated a range of different star wheels and guide rail assemblies having shapes and sizes to correspond to the particular containers that may be processed. A change of container required a time-consuming change in star wheels and guide rail assemblies. An improvement on this arrangement is disclosed in our co-pending patent application, referenced above. In that application, both the star wheel and the guide rail assembly are adjustable. The fingers of the star wheel rotate to allow larger containers to be received and the guide rail may also be moved closer to and further away from the star wheel.

Generally, when containers are conveyed along an automated handling line, the exact path they must follow is dictated by the centre point of the container. The reason for this is best illustrated by considering a filling machine that must pour liquid down the neck of a bottle. Clearly, the centre of the neck should be in the same position regardless of the size of the bottle. Accordingly, it is desirable for both the star wheel and the guide rail assembly to be adjustable such that different sizes of bottles can be conveyed along the handling line with their centres passing along the required path between star wheel and guide rail assembly.

An example of an adjustable guide rail assembly is provided by EP-A1-0,412,059 where half of the star wheel is enclosed by a two-part guide rail, each part subtending approximately 90°. The two halves are connected at their adjacent ends to a plate via a pair of vertical pins about which the guide rails can rotate. The plate and thus the proximal ends of each half of the guide rails can be driven radially towards the centre of the star wheel. The distal ends of each half of the guide rail are provided with angled slots that receive a further vertical pin. Thus, when the plate is driven radially, the proximal ends move radially but the distal ends move inwardly with substantially equal radial and tangential components. This tangential component of movement is undesirable as it moves the centre point of the semi-circle subtended guide rail away from the centre point of the star wheel so that they can be aligned concentrically in only a single position.

Against this background, and from a first aspect, the present invention resides in an automated handling line comprising a guide rail that defines the perimeter of a path of a container when conveyed along part of an automated handling line, the path and hence the perimeter being arcuate about a centre and positioned at a radius from the centre, wherein the guide rail is movable radially to define the perimeter at a plurality of different radii from substantially the same centre.

Such an arrangement is clearly beneficial as it may be used in combination with a star wheel such that only a single path is traced by the rotating star wheel and the static guide rail assembly, no matter how they are set (e.g. to accommodate differently sized containers). This is in contrast to the prior art arrangement described above that does not allow concentric adjustment.

Preferably, the guide rail comprises at least two segments, a first segment being driveable in a substantially radial direction and a second segment being connected to the first segment by a link such that the second segment follows movement of the first segment. The use of a segmented guide rail is useful as it allows more flexibility over a single piece guide rail. Optionally, the second segment is constrained to move radially by guide means. However, a segmented guide rail may otherwise suffer from the weakness that it is difficult to maintain its shape whilst being moved if it were not for the guide means employed in this invention. By employing a link and guide means, only one of the segments need be driven as the remaining segment is forced to follow by the link and this path is also constrained by the guide means to ensure the shape of the guide rail as a whole is preserved. The guide means may comprise a post received within a slot, the slot being elongated radially. This arrangement allows radial movement of the guide rail.

Optionally, the first segment is constrained to move radially by further guide means. The further guide means may comprise a post received within a slot, the slot being elongated radially. This helps further to constrain motion of the guide rail to the radial direction.

Preferably, the first and second segments are arranged in superposition to overlap and are provided with a slideable link between overlapping portions to allow relative circumferential movement between the first and second segments as the segments move radially inwardly and outwardly. This is advantageous as it allows the shape of the perimeter to be preserved when the guide rail is moved. For example, if a guide rail defining part of a circle is moved inwardly, the circumference it subtends should also decrease: as the separation between segments may decrease with this arrangement, the overall length of the guide rail decreases.

The slideable link comprises a post received within an elongate slot, the slot being optionally elongated in a circumferential direction.

Optionally, the first segment is connected to an actuator arranged to drive the first segment radially. The actuator may comprise a thumb wheel mounted on a shaft. The actuator may comprise a rack and pinion, the pinion being provided on the shaft and the rack being aligned in the radial direction. Alternatively, the actuator may comprise a cam arrangement.

Optionally, the guide rail assembly may further comprise a clamping mechanism operable to clamp the guide rail in position. The clamping mechanism may comprise a thumb wheel provided on a shaft with co-operating screw threads. The shaft may correspond to the post of the guide means or the further guide means.

The guide rail assembly may optionally further comprise a position indicator and a scale, wherein one of the position indicator or scale is fastened to the guide rail to move therewith and the other is fixed in position. This provides a simple indication of where the guide rail is set.

Optionally, the guide rail assembly further comprises a third segment, the third segment being connected to the second segment by a second link. Provision of further segments allows better preservation of the shape of the guide rail. The first and third segments may be driven by respective actuators that are coupled such that driving one actuator drives the other actuator.

Optionally, the actuators are driven by shafts coupled such that rotation of one shaft causes rotation of the other shaft. Preferably, sprockets connected by a chain are mounted on the shafts.

Preferably, the guide rail assembly further comprises a second guide rail like the guide rail of any preceding claim. This provides more stable support of a container. The second guide rail may be moveable independently of the first guide rail, or the second guide rail may be connected to the first guide rail so that they move in unison.

From a second aspect, the present invention resides in a method of adjusting an automated handling line guide rail assembly comprising a guide rail that defines the perimeter of a path of a container when conveyed along part of an automated handling line, the path and hence the perimeter being arcuate about a centre and positioned at a radius from the centre, the method comprising moving the guide rail radially to define the perimeter at a different radius from substantially the same centre.

In order that the invention can be more readily understood, reference will now be made by way of example only, to the accompanying drawings in which.

Figure 1:
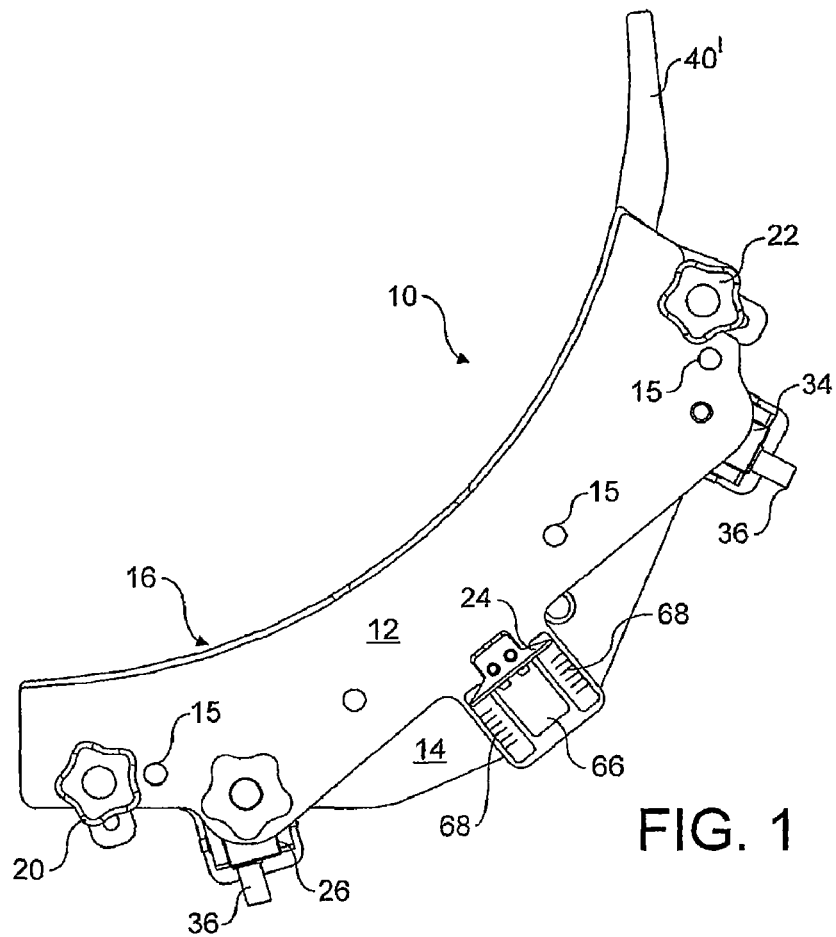
FIG. 1 is a plan view of an automated handling line guide rail assembly according to the present invention.
Figure 2:
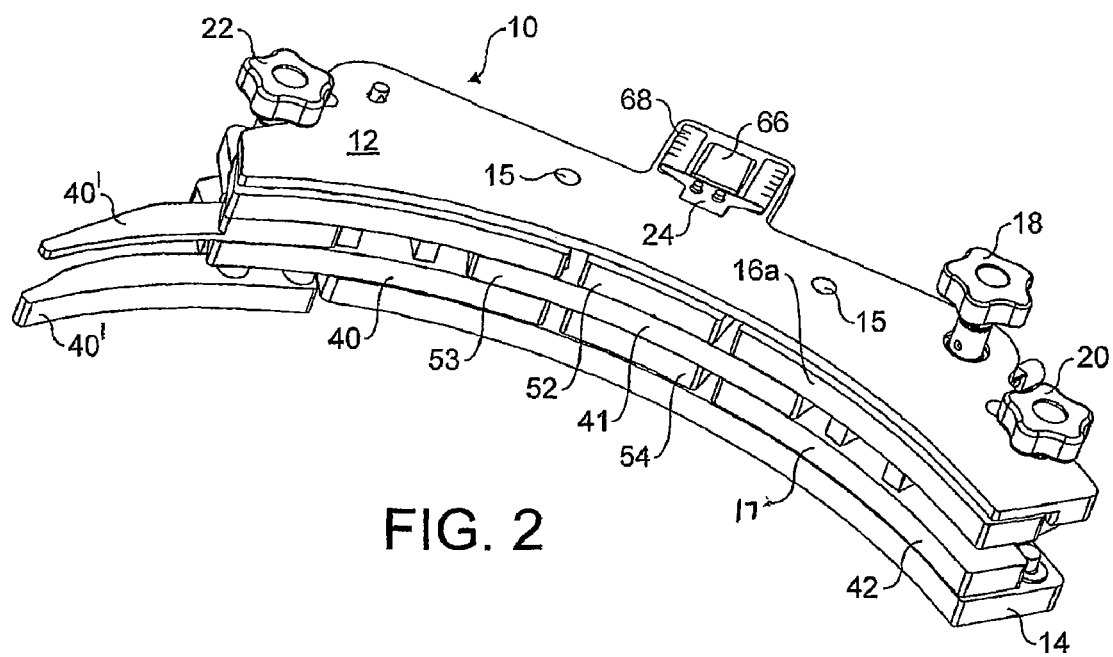
FIG. 2 is an isometric view of the guide rail assembly of FIG. 1 from above and in front.

An automated handling line guide rail assembly 10 defining a generally arcuate path corresponding to the arc of a circle of approximately 100° is shown in FIGS. 1 to 7. The guide rail assembly 10 comprises a generally flat, elongate structure bounded by a top plate 12 and a bottom plate 14 separated by posts 15. The guide rail assembly 10 also comprises a pair of guide rails 16, 17 defining the front arcuate surface. The guide rails 16, 17 correspond in size and shape and are positioned one 16 above the other 17. Three thumb wheels 18, 20, 22 and a position indicator 24 sit proud of the top plate 12.

Figure 3:
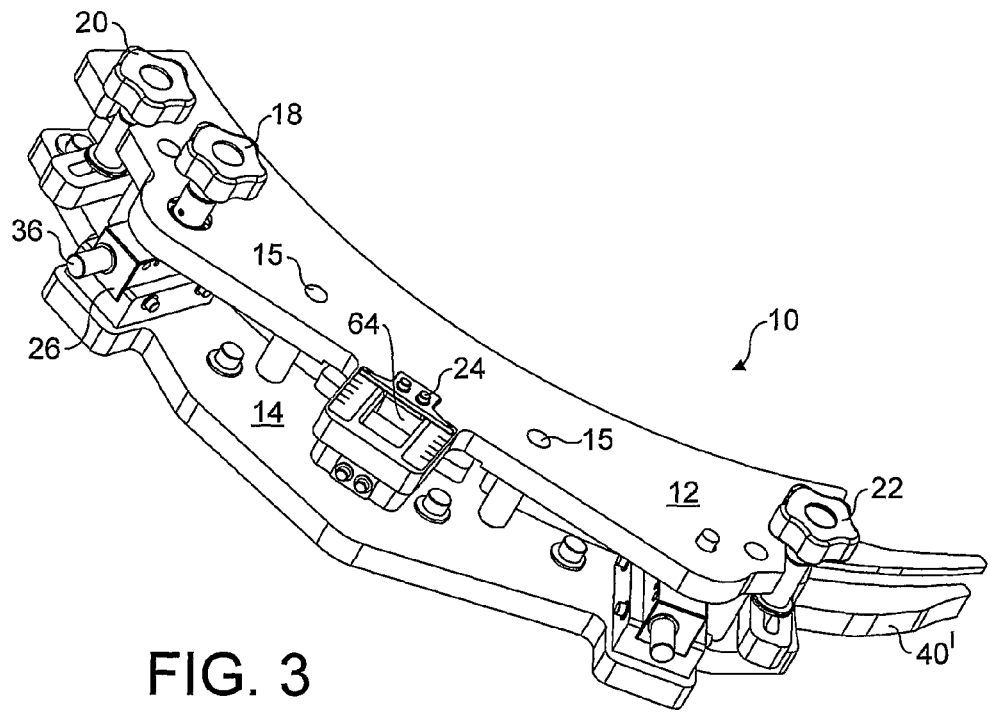
FIG. 3 is an isometric view of the guide rail assembly of FIG. 1 from above and behind.
Figure 5:
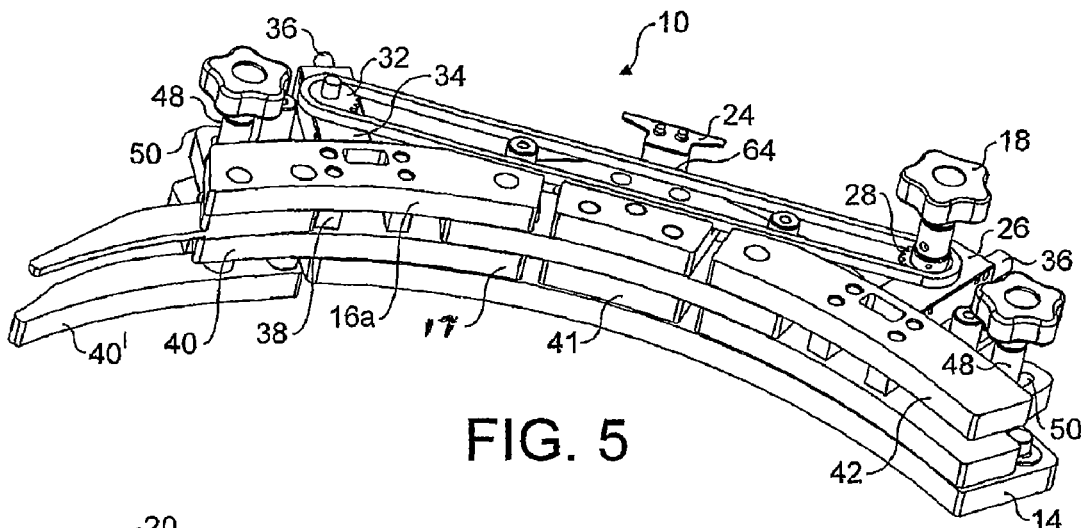
FIG. 5 is an isometric view of the guide rail assembly of FIG. 1 from above and in front, with the top plate removed.
Figure 6:
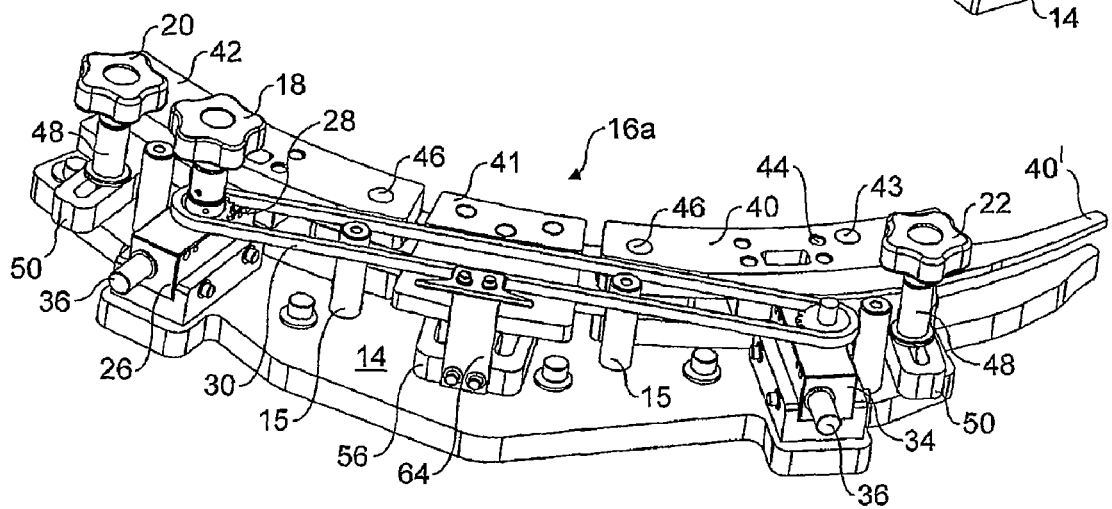
FIG. 6 is an isometric view of the guide rail assembly of FIG. 1 from above and behind, with the top plate removed.
Figure 7:
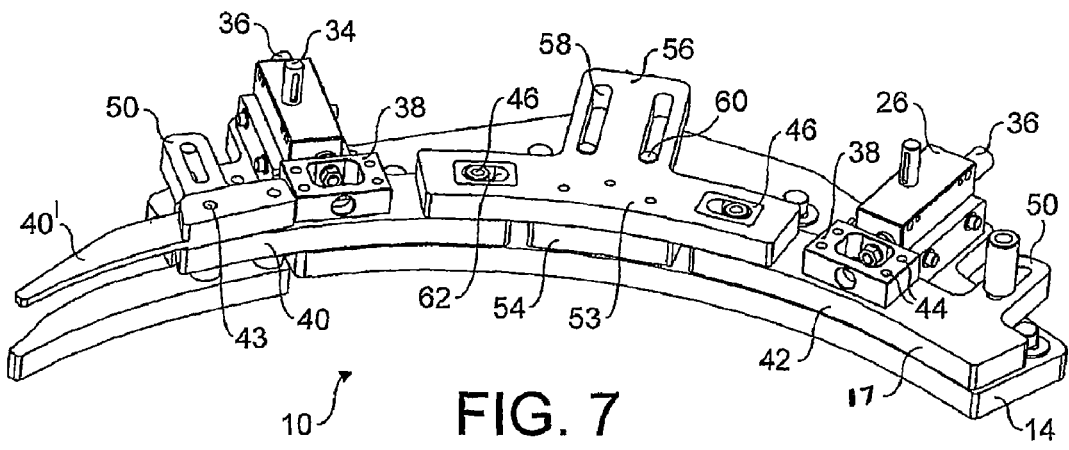
FIG. 7 is an isometric view of the guide rail assembly of FIG. 1 from above and in front, with various parts removed to show other features of the invention.

As can best be seen from FIG. 3, one of the thumb wheels 18 is mounted on a shaft that extends through the top plate 12 to enter an actuator box 26. Also mounted on the shaft beneath the thumb wheel 18 is a drive sprocket 28 that is used to drive a chain 30, as best seen in FIGS. 5 and 6. The other end of the chain 30 passes around a driven sprocket 32 that is mounted on a shaft that is connected to a second actuator box 34, identical to the first actuator box 24. The actuator boxes 26, 34 are provided with a rack and pinion gearing. The pinions are provided on the bottoms of the shafts also mounting the sprockets 28, 32, and the pinions are provided as rods 35 that are connected to yokes 38. The yokes 38 are in turn connected to the guide rails 16, 17, as best seen in FIG. 7. Accordingly, rotating the thumb wheel 18 causes the guide rails 16, 17 to be driven in and out by the rack and pinion gearing of the actuator boxes 26, 34.

The other thumb wheels 20, 22 provide a clamp that is used to secure the guide rails 16, 17 in position. Both thumb wheels 20, 22 are provided on a shaft with a screw thread that, when tightened, clamps together the top 12 and bottom 14 plates thereby firmly sandwiching the components therebetween to lock the guide rails 16, 17 in position.

As can best be seen from FIG. 5, the guide rails 16, 17 are divided into various parts that make up top 16 and bottom 17 guide rails, and left 40, centre 41 and right 42 segments. While the right segment 42 comprises only a single element for each of the top 16 and bottom 17 guide rails, the left segment 40 comprises a corresponding element that is joined via pins 43 to a lower finger 40'. These fingers 40' are positioned to mesh with fingers of a star wheel positioned at the same level as guide rails 16, 17.

Both guide rails 16, 17 move in unison in this embodiment by virtue of various pins that extend therebetween. For example, pins 44 protrude through apertures provided in the yokes 38 to be received in holes provided in the top 16 and bottom 17 guide rails. Other pins 46, pass through top 16 and bottom 17 guide rails and provide a link between adjacent segments. However, in other contemplated embodiments, the top 16 and bottom 17 guide rails may be moved independently, i.e. each of the top 16 and bottom 17 guide rails has its own dedicated pair of actuator boxes 26, 34, and thumb wheel 18 and drive chain 30.

Figure 4:
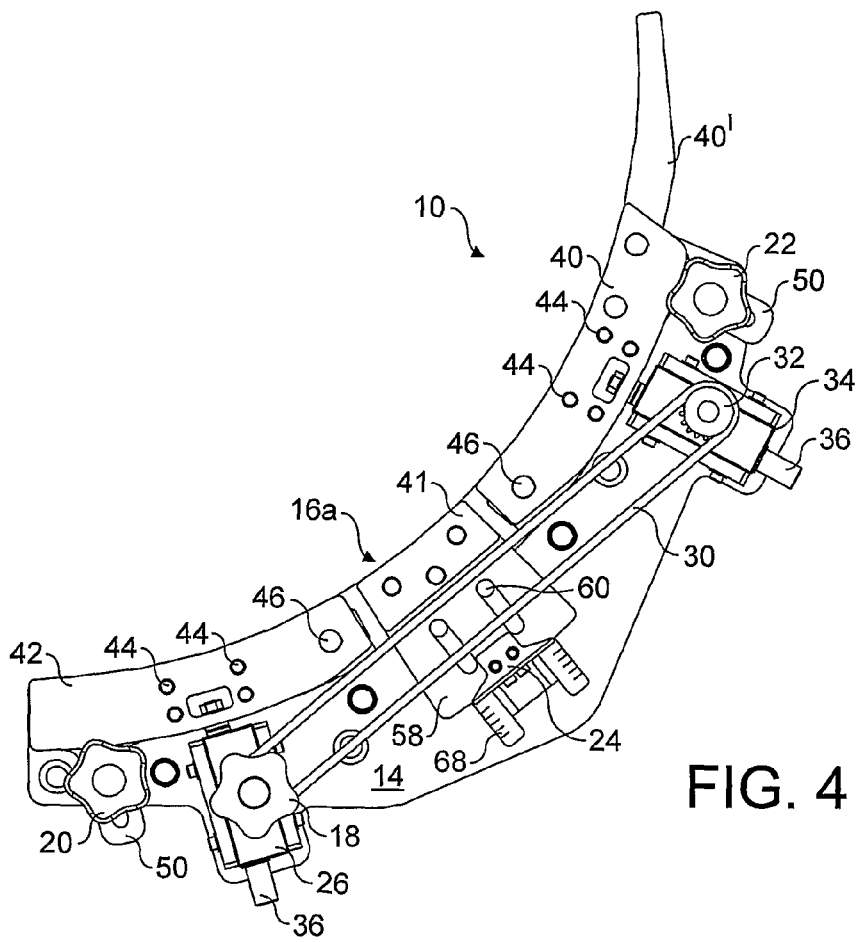
FIG. 4 is a plan view of the guide rail assembly of FIG. 1, with the top plate removed.

As can be seen most clearly from FIG. 4, the left segment 40 is connected to the yoke 38 of actuator box 34 and the right segment 42 is connected to the yoke 38 of actuator box 26. Accordingly, left 40 and right 42 segments are driven to move in the direction of movement of the rods 36 of actuator boxes 26, 34. The motion of the left 40 and right 42 segments is further constrained by a series of guide members that comprise posts 48 passing through apertures of a corresponding width but with an elongate length provided in enlarged lobes 50 of the left 40 and right segments. The posts are in fact provided by the shafts upon which the clamping thumb wheels 20, 22 are mounted, hence reducing the total parts count of the guide rail assembly 10. The rods 36 of the actuator boxes 26, 34 and the apertures provided in the lobes 50 are elongate in the radial direction of the arc that the guide rails 16, 17 provide. Thus, the left 40 and right 42 segments are constrained to move radially in and out. Common gearing of the sprockets 28, 32 that co-operate with the drive chain 30 ensures that the left 40 and right 42 segments move radially at the same rate.

The middle segment 41 comprises a three tier element: the top 52 and bottom 54 tiers comprise plates at the heights of the top 16 and bottom 17 guide rails adjacent the left 40 and right 42 segments, whereas the middle tier comprises a longer plate that extends at each side into the gap separating the top 16 and bottom 17 guide rail portions 53 of the left 40 and right 42 segments. Middle tier 53 includes a tab 56 at its rear that has a pair of slots 58. These slots 58 are also elongate in the radial direction and receive a pair of pins 60. Hence, the middle segment 41 is also constrained to move radially in and out.

The middle tier 53 also comprises a second pair of slots 62 at its ends that receive the pins 46 that fasten the top 16 and bottom 17 guide rails together. The slots 62 are elongate with a width corresponding to the pins 46 and a greater length that extends in a generally circumferential direction. Thus, the pins 46 provide a link between the left 40, middle 41 and right 42 segments such that rotating the thumb wheel 18 drives all three segments 40, 41, 42 to move radially. Specifically, while left 40 and right 42 segments are driven by the actuator boxes 26 and 34, the pins 46 making contact with the edges of apertures 62 urge the middle segment 41 to follow the left 40 and right 42 segments. Moreover, as the segments 40, 41, 42 are being driven radially, their separation must either increase or decrease as the circumference of the arc they subtend changes. For example, when being driven inwardly, the segments 40, 41, 42 will move together to define a smaller circumference as the outer limit of the path. The slots 62 provided in the middle tier 53 of the middle segment 41 allow the segments 40, 41, 42 to move inwardly towards each other thereby preventing jamming of the mechanism. As will be appreciated, the pins 46 merely slide along the slots 62 thereby allowing separation to vary.

Thus, as the guide rails 16, 17 are moved, the outer limit of the path the container will follow changes relative to the centre path and, moreover, the circumference of the outer path also changes to match the change in radius. This change in circumference is provided by the expandable gaps between the left 40 and middle 41 segments, and the middle 41 and right 42 segments that allow the guide rails 16, 17 as a whole to expand and contract as they are moved radially.

As described previously, a position indicator 24 is provided on top of the guide rail assembly 10. This position indicator 24 comprises a flat plate with a straight edge that is mounted from an upright 64 that is in turn fastened to the back of the tab 56 of the middle tier 53 of the middle segment 41. The upright 64 projects through an aperture 66 provided in the top plate 12 thereby allowing the position indicator 24 to move with the middle segment 41. The position indicator 24 is mounted with the edges of its straight edge above a pair of scales 68 provided on the top plate 12 to allow the position of the guide rails 16, 17 to be determined.

A skilled person would appreciate that the above embodiment may be varied in many different respects without departing from the scope of the present invention.

Although the above embodiment has a guide rail assembly that defines an arcuate path, other shapes are clearly also possible. For example, elliptical shapes can easily be achieved, as can other serpentine paths. One possibility is an S-shaped path where some segments 40, 41, 42 of the guide rails 16, 17 will move closer together while the separation of other segments will increase.

While the above embodiment has a pair of guide rails to support a container at different heights, any other number of guide rails 16, 17 may be used. For example, a single guide rail may be appropriate, particularly if it is of a greater height. Alternatively, three, four or even more guide rails may be used, particularly for tall containers or containers of varying widths. As mentioned above, the guide rails 16, 17 may either be fixed together to move in unison or each guide rail may be independently adjustable.

Whilst the above embodiment employs triple-segmented guide rails 16, 17, clearly any number of segments may be chosen for any particular purpose. Clearly, the more segments the better in that the invariance in the shape of the guide rails 16, 17 as they move. This is because each individual segment 40, 41, 42 has a fixed radius of curvature (chosen to be a maximum value for the required paths) and it is the expandable gaps between the segments 40, 41, 42 that allows the overall shape to be maintained. However, the more segments, the greater the complexity of the guide rail assembly 10 so there will always be a trade-off in this respect. However many segments are chosen, the number of segments provided with a dedicated actuator box 26, 34 may also be freely chosen. More actuator boxes could be provided, such as in a five segment guide rail wherein the first, third and fifth segments are directly driven and the second and fourth segments merely follow. Of course, only one segment need be driven and all remaining segments could follow.

The above embodiment uses actuator boxes that employ a rack and pinion system but other means that provide rotation to linear movement could be equally employable, such as a cam mechanism. For example, an eccentrically mounted roller may be employed that is used to push the guide rail segments radially in and out. Moreover, a rotational actuator such as a thumb wheel need not be provided. Other rotational actuators may be used or even linear actuators, such as slide members, may be used.

The invention claimed is:

1. An automated handling line guide rail assembly comprising a guide rail that defines the perimeter of a path of a container when conveyed along part of an automated handling line, the path and hence the perimeter being arcuate about a center and positioned at a radius from the center, wherein the guide rail is movable radially to define the perimeter at a plurality of different radii from substantially the same center;

wherein the guide rail comprises at least three segments, a first segment being driveable in a substantially radial direction, a second segment being connected to the first segment by a link and a third segment being connected to the second segment by a link such that the second and third segments follow movement of the first segment; and the first and second segments and the second and third segments are arranged in superposition to overlap and are provided with a slideable link between overlapping portions to allow relative circumferential movement between the first and second segments and the second and third segments as the segments move radially inwardly and outwardly.

2. The guide rail assembly of claim 1, wherein the second segment and/or the third segment is constrained to move radially by guide means.

3. The guide rail of claim 2, wherein the guide means constraining movement of the second and/or third segments comprises a post received within a slot, the slot being elongated radially.

4. The guide rail assembly of claim 2, wherein the first segment is constrained to move radially by further guide means.

5. The guide rail assembly of claim 4, wherein the further guide means comprises a post received within a slot, the slot being elongated radially.

6. The guide rail assembly of claim 1, wherein the slideable link between the first and second and/or second and third segments comprises a post received within an elongate slot.

7. The guide rail assembly of claim 6, wherein the slot is elongated in a circumferential direction.

8. The guide rail assembly of claim 1, wherein the first segment is connected to an actuator arranged to drive the first segment radially.

9. The guide rail assembly of claim 8, wherein the actuator comprises a thumb wheel mounted on a shaft.

10. The guide rail assembly of claim 9, wherein the actuator comprises a rack and pinion, the pinion being provided on the shaft and the rack being aligned in the radial direction.

11. The guide rail assembly of claim 1, further comprising a clamping mechanism operable to clamp the guide rail in position.

12. The guide rail assembly of claim 11, wherein the guide means comprises a post received within a slot, the slot being elongated radially, or wherein the first segment is constrained to move radially by further guide means comprising a post received within a slot, the slot being elongated radially, and wherein the clamping mechanism comprises a thumb wheel provided on a shaft, and the shaft corresponds to the post of the guide means or the further guide means.

13. The guide rail assembly of claim 1, further comprising a position indicator and a scale, wherein one of the position indicator or scale is fastened to the guide rail to move therewith and the other is fixed in position.

14. The guide rail assembly of claim 1, wherein the first and third segments are driven by respective actuators that are coupled such that driving one actuator drives the other actuator.

15. The guide rail assembly of claim 14, wherein the actuators are driven by shafts coupled by a chain that connects sprockets mounted on the shafts such that rotation of one shaft causes rotation of the other shaft.

16. The guide rail assembly of claim 1, further comprising a second guide rail.

17. The guide rail assembly of claim 16, wherein the second guide rail is connected to the first guide rail so that they move in unison.

18. The guide rail assembly of claim 17, wherein the slideable link comprises a post received within an elongate slot and wherein the first and second guide rails are connected by the post that is received within the elongate slot of the slideable link.

19. A method of adjusting an automated handling line guide rail assembly comprising a guide rail that defines the perimeter of a path of a container when conveyed along part of an automated handling line, the path and hence the perimeter being arcuate about a center and positioned at a radius from the center, wherein the guide rail comprises at least three segments, a first segment being driveable in a substantially radial direction, a second segment being connected to the first segment by a link and a third segment being connected to the second segment by a link such that the second and third segments follow movement of the first segment; and the first and second segments and the second and third segments are arranged in superposition to overlap and are provided with a slideable link between overlapping portions to allow relative circumferential movement between the first and second segments and the second and third segments as the segments move radially inwardly and outwardly, the method comprising moving the guide rail radially to define the perimeter at a different radius from substantially the same center.

\* \* \* \* \*